United States Patent [19]

Liao

[11] Patent Number: 5,449,051
[45] Date of Patent: Sep. 12, 1995

[54] PNEUMATIC OIL LUBRICATOR

[76] Inventor: Pen-Huai Liao, Suite 1, 11F, No. 95-8, Chang Ping Road, Sec. 1, Taichung Hsuan, Taiwan

[21] Appl. No.: 167,660

[22] Filed: Dec. 16, 1993

[51] Int. Cl.6 .............................................. F16N 7/30
[52] U.S. Cl. ................................. 184/55.1; 184/6.4; 184/6.28; 184/31; 248/129; 280/47.34; 280/79.2; 280/79.5; 418/270; 137/87
[58] Field of Search ............... 184/6.4, 6.28, 31, 55.1, 184/105.2; 418/270; 417/406; 248/129; 220/737; 280/47.34, 79.2, 79.5 CV; 137/87

[56] References Cited

U.S. PATENT DOCUMENTS

| 3,706,355 | 12/1972 | Oglesbee | 184/55.1 |
|---|---|---|---|
| 4,276,005 | 6/1981 | Bassan | 184/31 |
| 4,960,373 | 10/1990 | Albert | 418/270 |
| 5,110,147 | 5/1992 | Gershman | 280/79.5 |

FOREIGN PATENT DOCUMENTS

| 4018326 | 12/1991 | Germany | 418/270 |
|---|---|---|---|
| 0024485 | 2/1982 | Japan | 418/270 |
| 0076607 | 4/1950 | Norway | 248/129 |

Primary Examiner—F. Daniel Lopez
Assistant Examiner—Christopher Verdier

[57] ABSTRACT

A pneumatic oil lubricator for lubricating replenishment mainly has a pneumatic oil pump for pumping oil from a oil reservoir to an oil outlet unit, such as an oil gun. An automatic controlling apparatus is provided which has a hollow unit sleeve, a piston disposed in the hollow unit sleeve, and a spring mounted on the piston. The piston has interior air passage formed at one end thereof. The entrance and the exit of the interior air passage are faced to the second connecting inlet and the connecting outlet respectively. In which, the hollow sleeve has a first and a second connecting inlets at its two end and an connection outlet. The first connecting inlet is linked to an air compressor, the first connecting outlet is linked to the air outlet unit, and the connecting outlet is linked to an air inlet of the pneumatic oil pump. Since the oil pressure alters according to the switching on or off of the oil outlet unit, the piston will be driven to move in the unit sleeve that the interior air passage can be kept opened or closed. Thus, when the oil outlet unit is switched off, the interior air passage will be closed to stop the air flowing to the pneumatic oil pump that the pneumatic oil pump is stopped automatically without electric equipment.

8 Claims, 4 Drawing Sheets

PNEUMATIC OIL LUBRICATOR

BACKGROUND OF THE PRESENT INVENTION

The present invention relates to an oiler and more particularly relates to a pneumatic oil lubricator which can activate or stop the pneumatic oil pump automatically when the oil output, such as an oil gun, is switched on or switched off.

Conventional pneumatic oil lubricators comprise a pneumatic motor and an oil pump. A drive shaft of the motor is driven to rotate by compressed air. The rotating drive shaft can drive the interior vanes of the oil Pump to rotate for pumping oil from an oil reservoir to an outlet oil gun via oil hoses.

Since the oil pump will continue functioning even when the oil gun is switched off to close the outlet, the conventional pneumatic oil lubricator should comprise a pouring-back apparatus with safety valve which enables the oil to flow back to the oil reservoir in order to prevent the oil hoses from over pressured.

Practically, even the outlet oil gun is switched off, the conventional oiler, that is the pneumatic motor and the oil pump, will continue work. It is so boresome and inconvenient for an operator, who is operating the oil gun, to get back to turn off the oiler because it is always a long distance between the oiler and the oil gun. However, if we leave the pneumatic motor and the oil pump to actuate when the outlet is closed, it is properly wasting the power source.

SUMMARY OF THE PRESENT INVENTION

The main object of the present invention is to provide a pneumatic oil lubricator which can activate or stop the pneumatic oil pump automatically without the utilizing of electricity or electric equipment when the oil outlet unit, such as an oil gun, is switched on or switched off.

Another object of the present invention is to provide a pneumatic oil lubricator which oil pump is specifically designated for pneumatic oil lubricator that it has smaller size and simplified structure with lower cost than the convention's.

DETAILED DESCRIPTION OF THE PREFERRED EMBODIMENT

Figure 1:
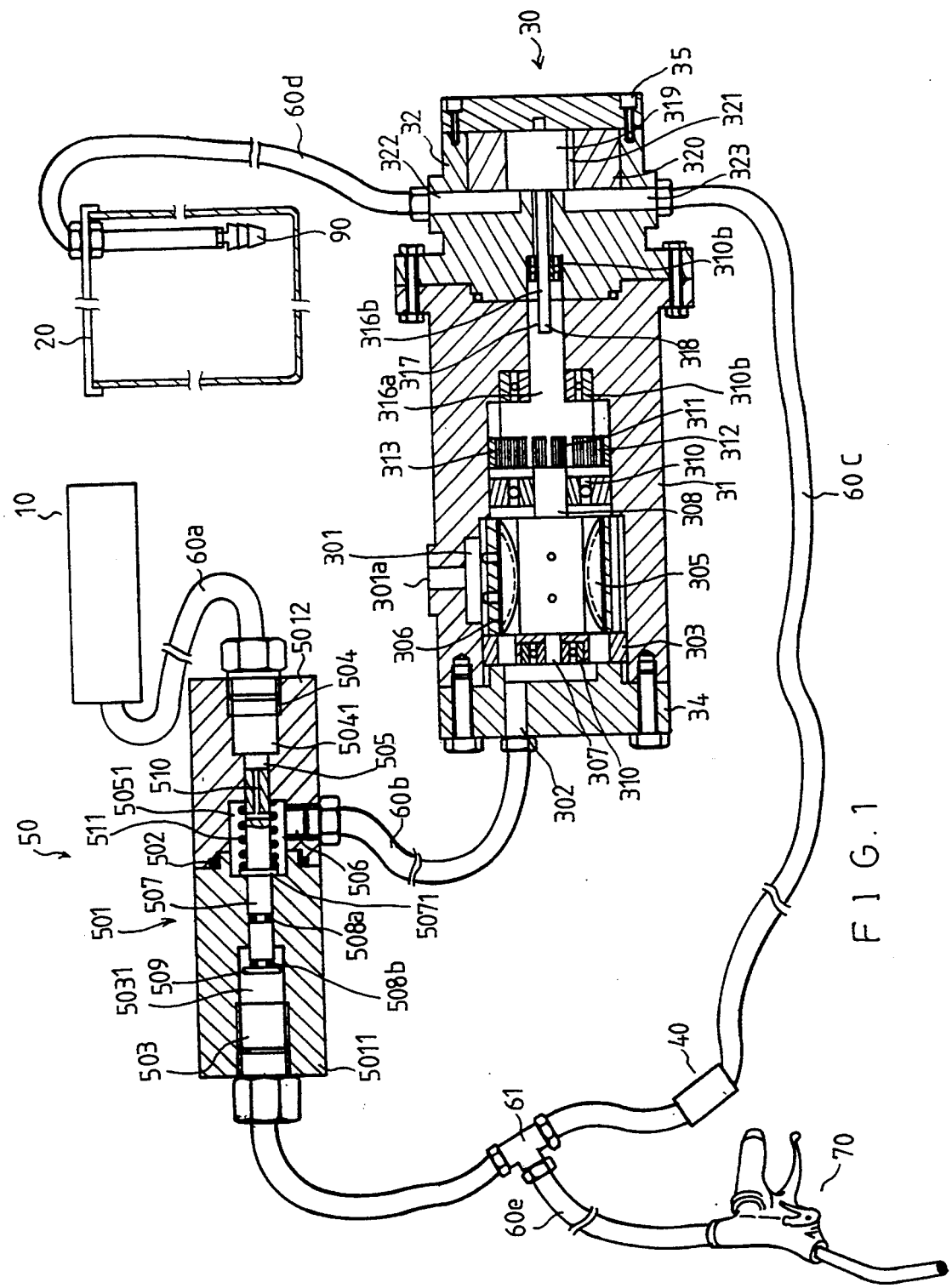
FIG. 1 is a sectional view of a preferred embodiment according to the present invention.
Figure 4:
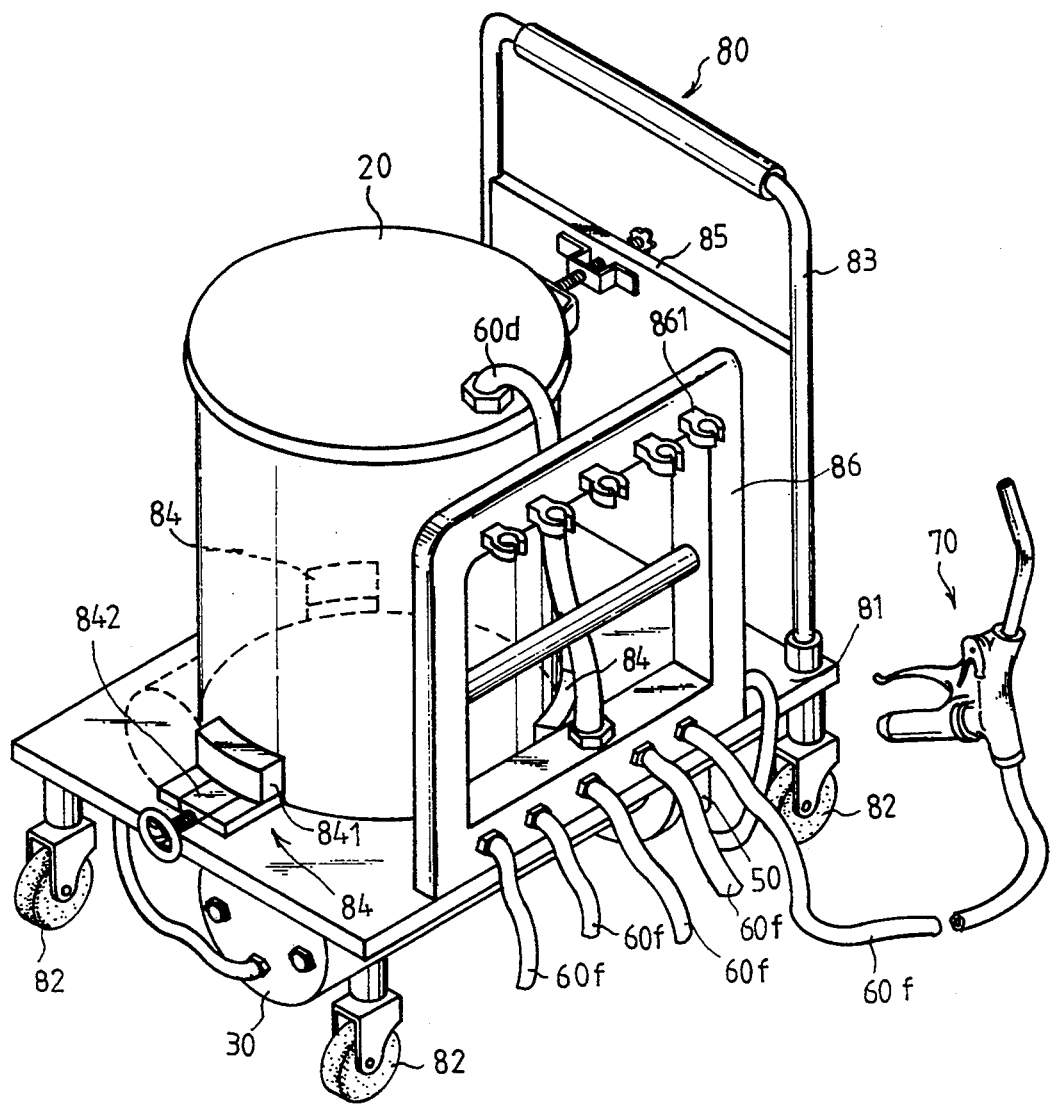
FIG. 4 is a perspective view of the above embodiment according to the present invention.

Please referring to FIGS. 1 and 4, the present invention is a pneumatic oil lubricator which comprises a pneumatic power source 10, an oil reservoir 20, a pneumatic oil pump 30, a safety valve 40, an automatic controlling apparatus 50, a plurality of oil hoses 60, at least an oil outlet unit 70, a stand 80, and an oil inlet unit 90.

The pneumatic power source 10 which supplies compressed air generally is an air compressor.

Figure 2:
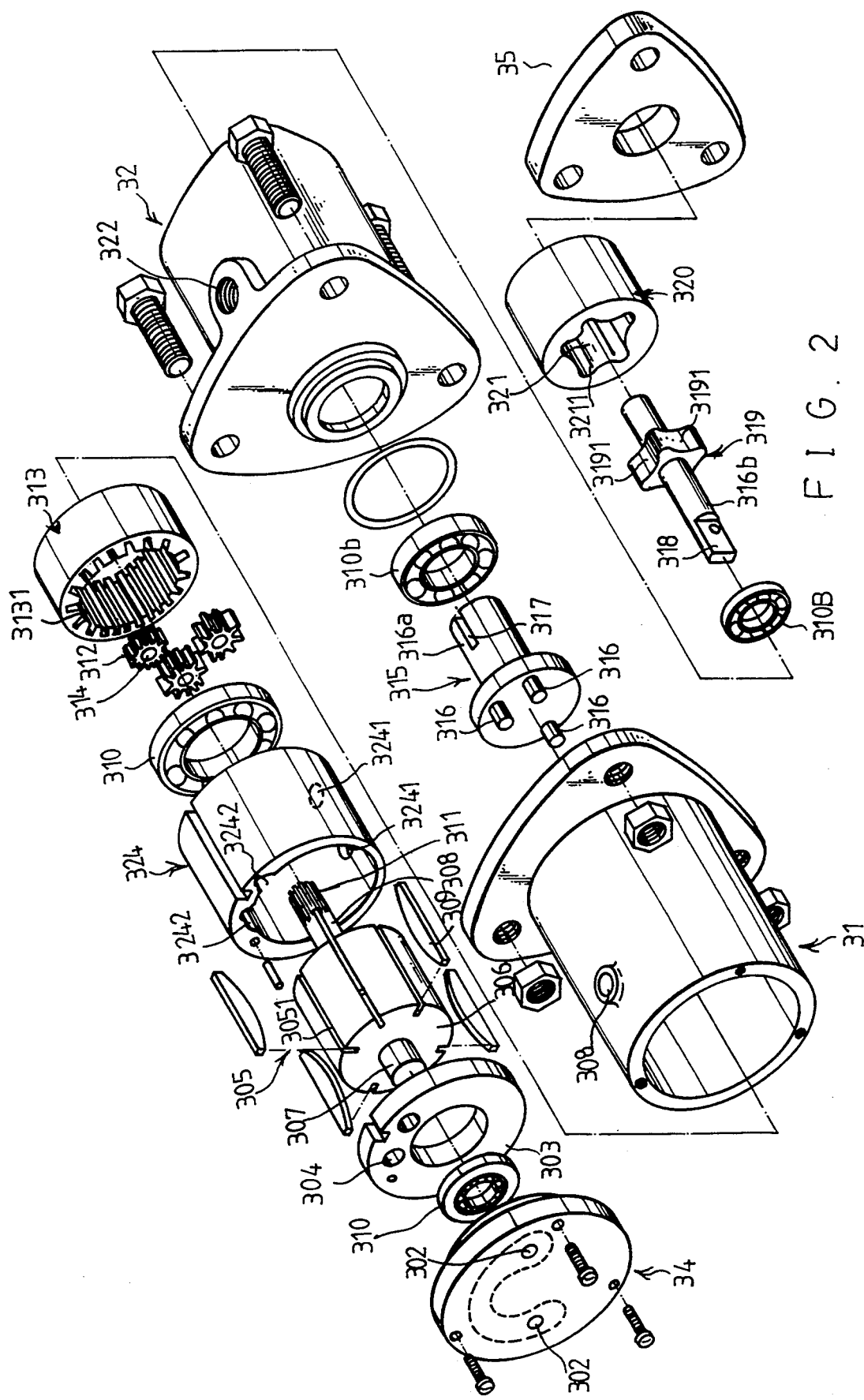
FIG. 2 is an exploded isometric view of the pneumatic oil pump of the above embodiment according to the present invention.

The pneumatic oil pump 30, as shown in FIGS. 1 and 2, comprises a hollow case which has a first end case 31 and a second end case 32. The second end case 32 is oil-sealed and axially connected with the first end case 31. The first end case 31 provides an annular air groove 301 at the interior wall which has an air outlet 301a. The second end case 32 provides an oil inlet 322 and an oil outlet 323.

The pneumatic oil pump 30 further comprises an air seat 303, a vane spindle 305, a sleeve 324, at least three gears 312, a gear ring 313, a drive shaft 315, an oil seat 320 and two end covers 34 and 35.

The air seat 303, coaxially disposed in a forward end of the first end case 31, has at least an air inlet passage 304 therein. The sleeve 324 is coaxially disposed in the first end case 31 and secured to the air seat 303. The sleeve 324 also provides at least an air hole 3241 thereon and two longitudinal air grooves 3242 on it's inner periphery.

The vane spindle 305 comprises a vane seat 306, a first and a second end shafts 307 and 308 which are coaxially connected to the two ends of the vane seat 306 respectively, and a plurality of vanes 309 which are longitudinally mounted on the corresponding longitudinal slots 3051 provided on the outer surface of the vane seat 306. The vane spindle 305 is coaxially disposed in the sleeve 324 and connected to the air seat 303 by means of a pair of bearings 310 which are mounted on the first and second end shafts 307 and 308 respectively. One end of second end shaft 308 forms a gear end portion 311.

The gear ring 313 is coaxially disposed in the first end case 31 and provides an interior near portion 3131. The three gears 312 each has a central hole 314 and is engaged with the interior near portion 3131 of the gear ring 313 and the gear end portion 311 of the second end shaft 308 of the vane spindle 305.

The drive shaft 315 has two sections wherein the first section 316a is disposed in the first end case 31 and the second section 316b is disposed in the second end case 32 by means of a pair of bearings 310b. The first section 316a of the drive shaft 315 comprises at least three drive pins 316 at one end for inserting into the three central holes 314 of the gears 312 respectively. The other end of the first section 316a provides a slot 317. One end of the second section 316b forms a connecting tip 318 which is inserted in the slot 317 for coaxially connecting with the first section 316a. The second section 316b of the frive shaft 315 further comprises a driving head 319 protruded at the other end portion which forms a plurality of outer longitudinal oil grooves 3191.

The oil seat 320, which is coaxially disposed in the second end case 32, has a central opening 321 which provides a plurality of longitudinal inner oil grooves 3211 that the innermost diameter of the central opening 321 is slightly larger than the outermost diameter of the driving head 319. The driving head 319 is disposed in the oil seat 320.

The first end cover 34, which is secured to the forward end of the first end case 31, provides at least an air inlet 302. The second end cover 35 is secured to the rearward end of the second end case 32.

Figure 3:
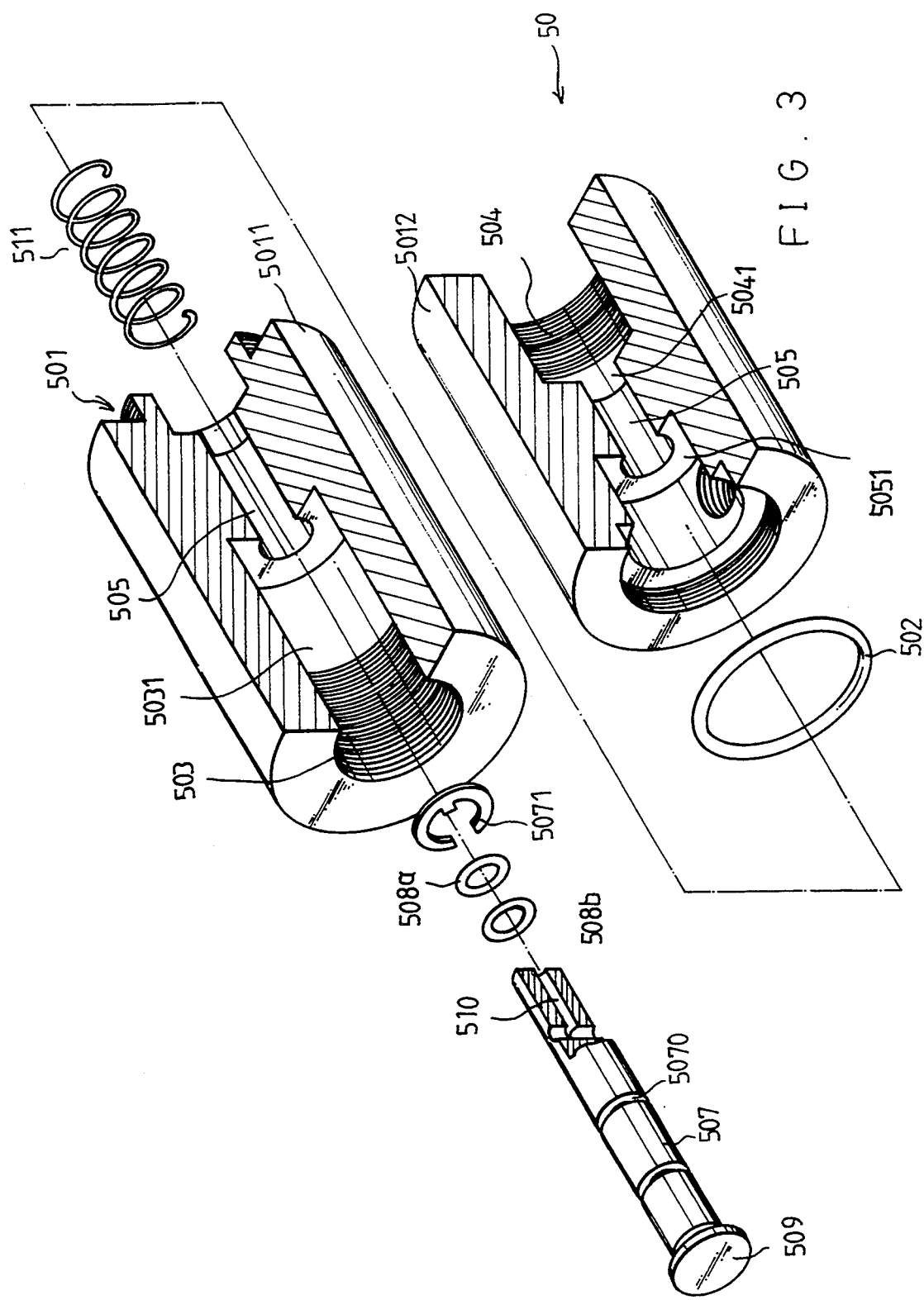
FIG. 3 is an exploded isometric view of the automatic controlling apparatus of the above embodiment according to the present invention.

The automatic controlling apparatus 50, as shown in FIGS. 1 and 3, comprises a hollow unit sleeve 501, a piston 507, and a spring 511.

The unit sleeve 501 comprises two portions 5011 and 5012 which are coaxially screwed together to form an hollow sleeve with a seal 502 therebetween. The unit sleeve 501 has a first and a second connecting inlets 503 and 504 at its two ends respectively. An oil chamber 5031 is formed in the unit sleeve 501 adjacent to the first connecting inlet 503 and an air chamber 5041 is formed in the unit sleeve 501 adjacent to the second connecting inlet 504. A central passage 505 is formed between the oil chamber 5031 and the air chamber 5041. A connecting outlet 506 is transversely formed at an enlarged chamber 5051 provided in the central passage 505.

The piston 507, which is coaxially disposed in the central passage, has one end located in the oil chamber 5031. The other end of the piston 507 provides an interior air passage 510. The central portion of the piston 507 forms an annular groove 5070 for engaging with a holding ring 5071 which is located at the enlarged chamber 5051 of the central passage 505. Thus the motion of the piston 507 is limited between the two ends of the enlarged chamber 5051. The spring 511 is disposed between the holding ring 5071 of the piston 507 and one inner end of the central chamber 5051.

A first hose 60a is connected between the pneumatic power source 10 and the second connecting inlet 504 of the automatic controlling apparatus 50. A second hose 60b is connected between the connecting outlet 506 of the automatic controlling apparatus 50 and the air inlet 302 of the first end cover 34 of the pneumatic oil pump 30. A third hose 60c is connected between the oil outlet 323 of the second end case 32 of the pneumatic oil pump 30 and the first connecting inlet 503 of the automatic controlling apparatus 50. A fourth hose 60d is connected between the oil inlet 322 of the second end case 32 of the pneumatic oil pump 30 and the oil inlet unit 90 which is inserted into the oil reservoir 20. At least an outlet hose 60e is connected between the oil outlet unit 70 and the third hose 60c by means of a joint 61.

Referring to FIG. 1, the safety valve 40 is disposed on said third hose 60c between the pneumatic oil pump 30 and the oil outlet unit 70 for controlling the oil to flow in one way only, that is from the oil outlet 323 of the pneumatic pump 30 to the oil outlet unit 70 that prevents any oil flowing reverse back to the pneumatic pump 30.

As illustrated by FIG. 1, compressed air is discharged from the air compressor 10 to the second connecting inlet 504 of the automatic controlling apparatus 50 via the first hose 60a. Then, the compressed air passes through the interior air passage 510 of the piston 507 to the enlarged chamber 5051 of the central passage 505 and flows from the connecting outlet 506 to the air inlet 302 of the pneumatic oil pump 30 via the second hose 60b. The vane spindle 305 is driven to rotate when the compressed air from the air inlet 302 flows through the air inlet passage 304 of the air seat 303 to the air grooves 3242 of the sleeve 324. That compressed air will be discharged from the pneumatic oil pump 30 to the enviroment via the air hole 3241 of the sleeve 324 and the air outlet 301a of the first end case 31 of the pneumatic oil pump 30. The gear end portion 311 of the second end shaft 308 of the rotating vane spindle 305 then drives the three gears 312 to rotate around the interior gear portion 3131 of the gear ring 313. Thus the drive shaft 315 is driven to rotate about its axis by the three gears 312. Meanwhile, the driving head 319 of the drive shaft 315 is also driven to rotate within the oil seat 320 to achieve pumping effect.

The oil inlet unit 90 is a tubular head or simply an opening end of the fourth hose 60d which is immersed in the oil reservoir 20. The oil reservoir 20 is an oil tank, according to the present embodiment, which provides new oil for pumping to any desired apparatus, such as the engine of an vehicle.

Due to the pumping effect of the rotating driving head 319 in the oil seat 320, oil in the oil reservoir 20 is sucked to the oil inlet 322 of the second end case 32 of the pneumatic oil pump 30 via the fourth hose 60d. The oil is then pumped out from the oil outlet 323 of the pneumatic oil pump 30 to the third hose 60c which is linked to the first connecting inlet 503 of the automatic controlling apparatus 50 and the oil outlet unit 70, an oil gun, via the outlet hose 60e for oil discharging.

When the oil outlet unit 70 is switched on for oil discharging, the spring 511 pushes the piston 507 towards the oil chamber 5031 that enables the compressed air to flow from the second connecting inlet 504 to the connecting outlet 506 via the interior air passage 505 which is maintained opened by placing its exit in the enlarged chamber 5051 in order to keep the pneumatic oil pump 30 actuate. When the oil outlet unit 70 is switched off to close the outlet, the pressure of the continued flowing oil will be increased because of the closed outlet. That compressed oil flows into the oil chamber 5031 of the automatic controlling apparatus 50, presses the piston 507 towards the second connecting inlet 504 and compressed the spring 511. The exit of the interior air passage 510 is then closed by the interior wall of the interior air passage 505. So that no air can be flown out through the connecting outlet 506. Thus, the compressed air supply to the pneumatic oil pump 30 is cut that the pneumatic oil pump 30 is turned off automatically to stop the pumping of oil.

If the oil outlet unit 70 is switched on again, the compressing pressure to the spring 511 is released. The piston 507 is pressed to move back towards the first connecting inlet 503 by the spring 511. The interior air passage reopens, which enables the compressed air to flow to and activate the pneumatic oil pump 30 again automatically.

As shown in FIG. 4, the stand 80 of the pneumatic oil lubricator comprises a base 81 which has four wheels 82 spacedly attached to its bottom which receives the pneumatic oil pump 30 and the automatic controlling apparatus 50. A handle frame 83 of predetermined height is secured to one side of the base 81. On the base 81, three pressing clamps 84 are mounted triangularly to define a central receiving area therebetween for receiving the oil reservoir 20. Each pressing clamp 84 comprises a press board 841 which can be pushed forward or pulled backward by a conventional screwing unit 842, so that the central receiving area can be adjusted to adapt the oil reservoir 20 of different sizes. Furthermore, the oil reservoir 20 can be clamped firmly by adjusting the three press board 841 of the pressing clamp 84 to press on the exterior surface of the oil reservoir 20. At the upper portion of the handle frame 83, an adjustable support 85 is mounted thereon for holding on the upper portion of the oil reservoir 20. The base further comprises a hose holder 86 at one side, which provides a plurality of hose catches 861 to receive those hoses 60 in position for easy transportation.

According to present invention disclosed above, the pneumatic oil lubricator can activate or stop the pneumatic oil pump 30 automatically without the utilizing of elctricity or eletric equipment when the oil outlet unit (the oil gun) is switched on or switched off. Moreover, the pneumatic oil pump 30 has smaller size and simplified structure with lower cost than the conventional.

I claim:

1. A pneumatic oil lubricator, comprising:
   a pneumatic power source which supplies compressed air;
   an oil reservoir;
   at least an oil outlet unit;
   a pneumatic oil pump comprising a hollow case, an air seat, a vane spindle, a sleeve, at least three gears, a gear ring, a drive shaft, an oil seat, and two end covers, in which
      said hollow case comprising a first end case and a second end case which is oil-scaled and axially connected with said first end case, said first end case having an interior air groove which has an air outlet, said second end case having an oil inlet and an oil outlet;
      said air seat, coaxially disposed in the forward end of said first end case having at least an air inlet passage therein;
      said sleeve, coaxially disposed in said first end case and secured to said air seat having at least an air hole;
      said vane spindle comprises a vane seat, a first end shaft and a second end shaft which are coaxially connected to the two ends of said vane seat respectively, and a plurality of vanes which are longitudinally mounted on the outer periphery of said vane seat; said vane spindle is coaxially disposed in said sleeve and next to said air seat, by means of a pair of bearings which are mounted on said first and second end shafts respectively, one end of said second end shaft forms a gear end portion;
      said gear ring, coaxially disposed in said first end case having an interior gear portion;
      said three gears each having a central hole and being engaged with said interior gear portion of said gear ring and said gear end portion of said second end shaft of said vane spindle;
      said drive shaft comprising a first and a second section wherein said first section being disposed in said first end case and said second section being disposed in said second end case by means of a pair of bearings, said drive shaft having at least three drive pins at one end of said first section for inserting into said three central holes of said gears respectively, said drive shaft further comprising a driving head protruding at said second section which forms a plurality of outer longitudinal oil grooves;
      said oil seat, coaxially disposed in said second end case having a central opening which provides a plurality of longitudinal inner oil grooves such that the innermost diameter of said central opening being slightly larger than the outermost diameter of said driving head, said driving head being disposed in said oil seat;
      said first end cover, secured to the forward end of said first end case having at least an air inlet said second end cover being secured to the free end of said second end case;
   an automatic controlling apparatus which comprises hollow unit sleeve, a piston and a spring, in which said unit sleeve having a first and a second connecting inlet at, the opposite ends respectively, an oil chamber formed in said unit sleeve adjacent to said first connecting inlet, an air chamber formed in said unit sleeve adjacent to said second connecting inlet, a central passage formed between said oil chamber and said air chamber and a connecting outlet transversely formed at an enlarged chamber provided in said central passage;
   said piston, coaxially disposed in said central passage having one end located in said oil chamber and the other end being provided with an interior air passage, the central portion of said piston comprising a holding ring located at said enlarged chamber of said central passage;
   said spring being disposed between said holding ring of said piston and one inner side of said central chamber;
   a first hose being connected between said pneumatic power source and said second connecting inlet of said automatic controlling apparatus, a second hose being connected between said connecting outlet of said automatic controlling apparatus and said air inlet of said first end cover of said pneumatic oil pump, a third hose being connected between said oil outlet of said second end case of said pneumatic oil pump and said first connecting inlet of said automatic controlling apparatus, a fourth hose being connected between said oil inlet of said pneumatic oil pump and said oil reservoir, and at least an outlet hose being connected between said oil outlet unit and said third hose by means of a joint; and
   a safety valve being disposed on said third hose between said pneumatic oil pump and said oil outlet unit for controlling the flow in one way only.

2. A pneumatic oil lubricator as recited in claim 1, wherein said outer surface of said vane seat provides a plurality of longitudinal slots for mounting said corresponding vanes.

3. A pneumatic oil lubricator as recited in claim 1, wherein the other end of said first section provides a slot and one end of said second section forms a connecting tip which is inserted in said slot for coaxially connecting with said first section.

4. A pneumatic oil lubricator as recited in claim 1, wherein said unit sleeve of said automatic controlling apparatus comprises two portions which are coaxially screwed together to from a hollow sleeve with a seal therebetween.

5. A pneumatic oil lubricator as recited in claim 1, wherein said central portion of said piston of said automatic controlling apparatus forms an annular groove for engaging with said holding ring.

6. A pneumatic oil lubricator as recited in claim 1, wherein an oil inlet unit is provided at one end of said fourth hose, which is inserted into the oil reservoir.

7. A pneumatic oil lubricator as recited in claims 1 or 6, wherein said oil reservoir is an oil tank.

8. A pneumatic oil lubricator as recited in claim 1, said pneumatic oil lubricator further comprises a stand which has a base, said base having four wheels attached to its under side which receives said pneumatic oil pump and said automatic controlling apparatus, a handle frame of predetermined height being secured to one side of said base; on said base, three pressing clamps being mounted triangularly to define a central receiving area therebetween for receiving said oil reservoir, each pressing clamp comprising a press board which can be pushed forward or pulled backward by a screwing unit so that the central receiving area can be adjusted to adapt oil reservoirs in different sizes; furthermore, said oil reservoir can be clamped firmly by adjusting said three pressing boards of said pressing clamps to press on the outer periphery of said oil reservoir, at the top of said handle frame, an adjustable support being mounted thereon for holding said oil reservoir, said base further comprising a hose holder at one side which provides a plurality of hose catches to receive said hoses in position for transportation.

* * * * *